US008511624B2

(12) United States Patent
Tang et al.

(10) Patent No.: US 8,511,624 B2
(45) Date of Patent: Aug. 20, 2013

(54) HEIGHT ADJUSTBLE DISPLAY DEVICE

(75) Inventors: Chao Tang, Shenzhen (CN); Zhong-Jie Luo, Shenzhen (CN); Jie-Yi Shu, Shenzhen (CN); Jian-Hui Dai, Shenzhen (CN); Chun-Che Yen, New Taipei (TW); Te-Sheng Jan, New Taipei (TW); Yu-Tao Chen, New Taipei (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 25 days.

(21) Appl. No.: 13/307,009

(22) Filed: Nov. 30, 2011

(65) Prior Publication Data

US 2013/0048803 A1  Feb. 28, 2013

(30) Foreign Application Priority Data

Aug. 29, 2011  (CN) .......................... 2011 1 0250803

(51) Int. Cl.
*F16M 11/00*  (2006.01)

(52) U.S. Cl.
USPC ........ 248/161; 248/919; 248/423; 248/128.5; 361/679.02

(58) Field of Classification Search
USPC .................... 248/161, 917, 919, 423, 123.11, 248/128.5, 295.11; 361/679.02, 679.22
See application file for complete search history.

(56) References Cited

U.S. PATENT DOCUMENTS

| 6,874,738 | B2 * | 4/2005 | Ishizaki et al. ............ 248/176.3 |
| 6,918,564 | B2 * | 7/2005 | Yen et al. ....................... 248/404 |
| 6,994,303 | B2 * | 2/2006 | Lin et al. .................... 248/122.1 |
| 7,036,787 | B1 * | 5/2006 | Lin ............................... 248/676 |
| 7,497,410 | B2 * | 3/2009 | Lee .............................. 248/398 |
| 7,628,361 | B2 * | 12/2009 | Gan et al. ...................... 248/132 |
| 7,722,003 | B2 * | 5/2010 | Ishizaki et al. ........... 248/295.11 |
| 7,946,548 | B2 * | 5/2011 | Sun ........................... 248/231.31 |
| 8,016,252 | B2 * | 9/2011 | Su et al. ......................... 248/157 |
| 8,079,554 | B2 * | 12/2011 | Sui et al. ....................... 248/157 |
| 8,201,782 | B2 * | 6/2012 | Fan ............................ 248/125.8 |
| 8,201,784 | B2 * | 6/2012 | Tang et al. ................. 248/162.1 |
| 8,317,139 | B2 * | 11/2012 | Su et al. ......................... 248/127 |
| 2008/0023599 | A1 * | 1/2008 | Lin ............................ 248/122.1 |
| 2008/0142659 | A1 * | 6/2008 | Sun .......................... 248/226.11 |
| 2011/0297801 | A1 * | 12/2011 | Su et al. ....................... 248/161 |

* cited by examiner

*Primary Examiner* — Terrell McKinnon
*Assistant Examiner* — Daniel J Breslin
(74) *Attorney, Agent, or Firm* — Altis Law Group, Inc.

(57) ABSTRACT

A height-adjustable display device for a display includes a base defining a chamber, a supporting member and a latching member. The supporting member is received and vertically movable in the chamber. The supporting member is connected to the display. The supporting member defines a plurality of grooves arranged a vertical direction. The latching member is pivotedly mounted to the base. The latching member includes a hook able to be received in one of the grooves, thereby retaining the supporting member in a desired vertical position.

6 Claims, 4 Drawing Sheets

HEIGHT ADJUSTBLE DISPLAY DEVICE

BACKGROUND

1. Technical Field

The present disclosure relates to display devices, particularly, to a display device with a height-adjustable supporting member.

2. Description of Related Art

The display devices includes a display and a support. Generally, the support cannot be adjusted in vertical direction, so the display is positioned in a stationary height, which cannot meet the requirements of specific users.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
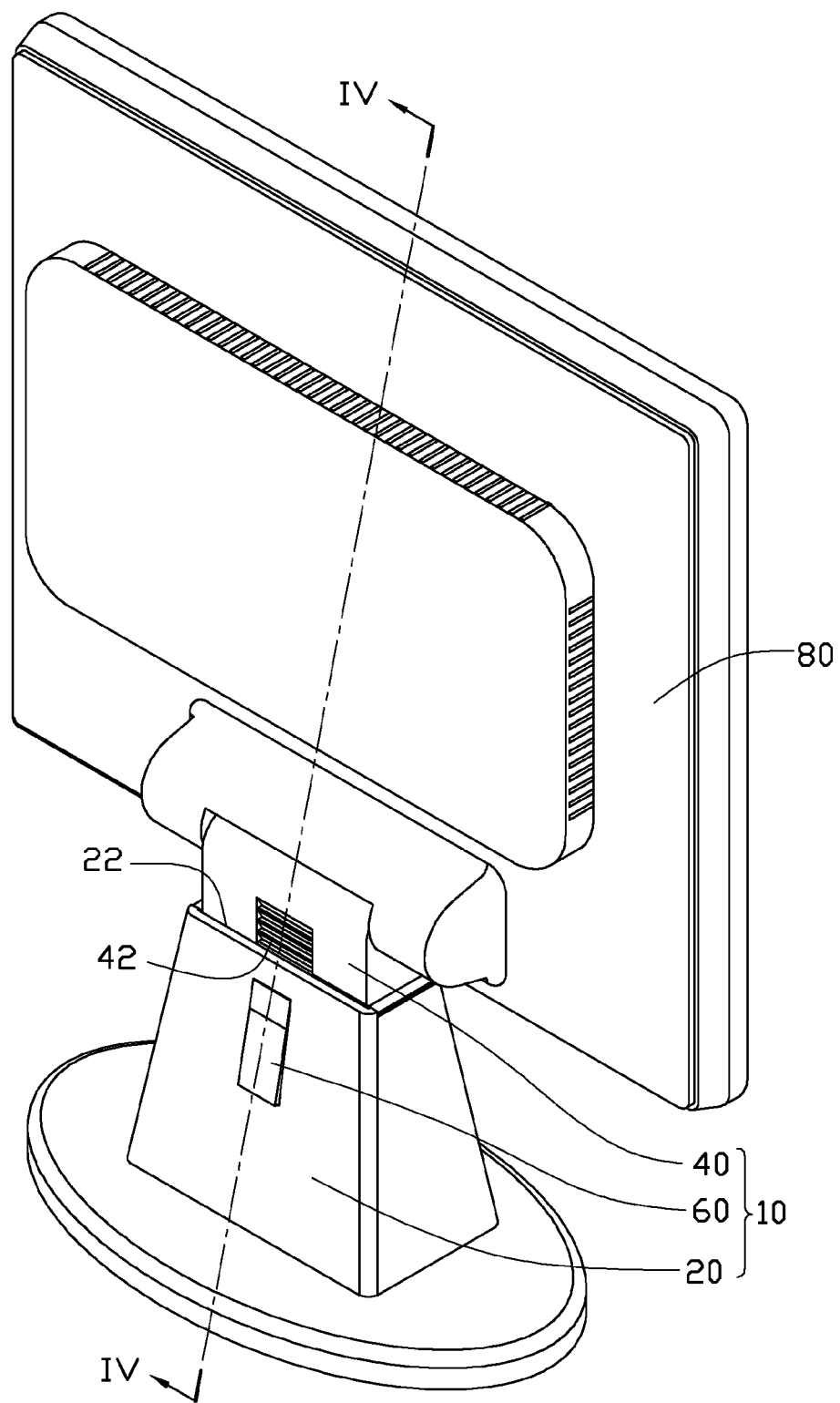
FIG. 1 is an isometric view of a height-adjustable display device according to an exemplary embodiment.

Referring to FIG. 1, according to an exemplary embodiment, a height-adjustable display device 10 includes a base 20 defining a chamber 22, a supporting member 40 and a latching member 60. A display 80 is rotatably fixed to the top of the supporting member 40. The supporting member 40 is received and vertically movable in the chamber 22, thereby adjusting the height of the display 80. The supporting member 40 defines a number of vertically oriented grooves grooves 42 therein. The grooves 42, as a whole, are arrange along a vertical direction. The latching member 60 is pivotedly mounted to the base 20 can be engagingly received in one of the grooves 42, thus retaining the supporting member 40 in a desired vertical position.

Figure 2:
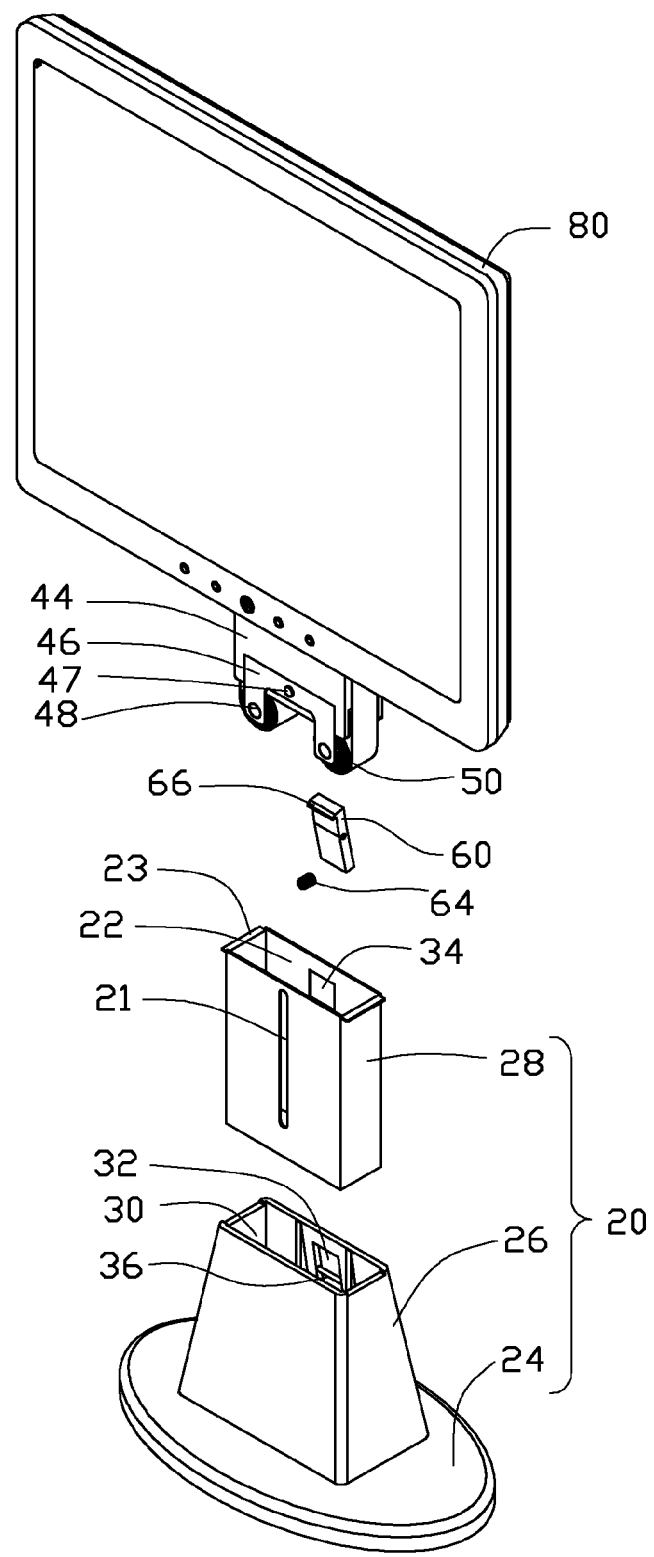
FIG. 2 is an exploded view of the height-adjustable display device in FIG. 1.
Figure 3:
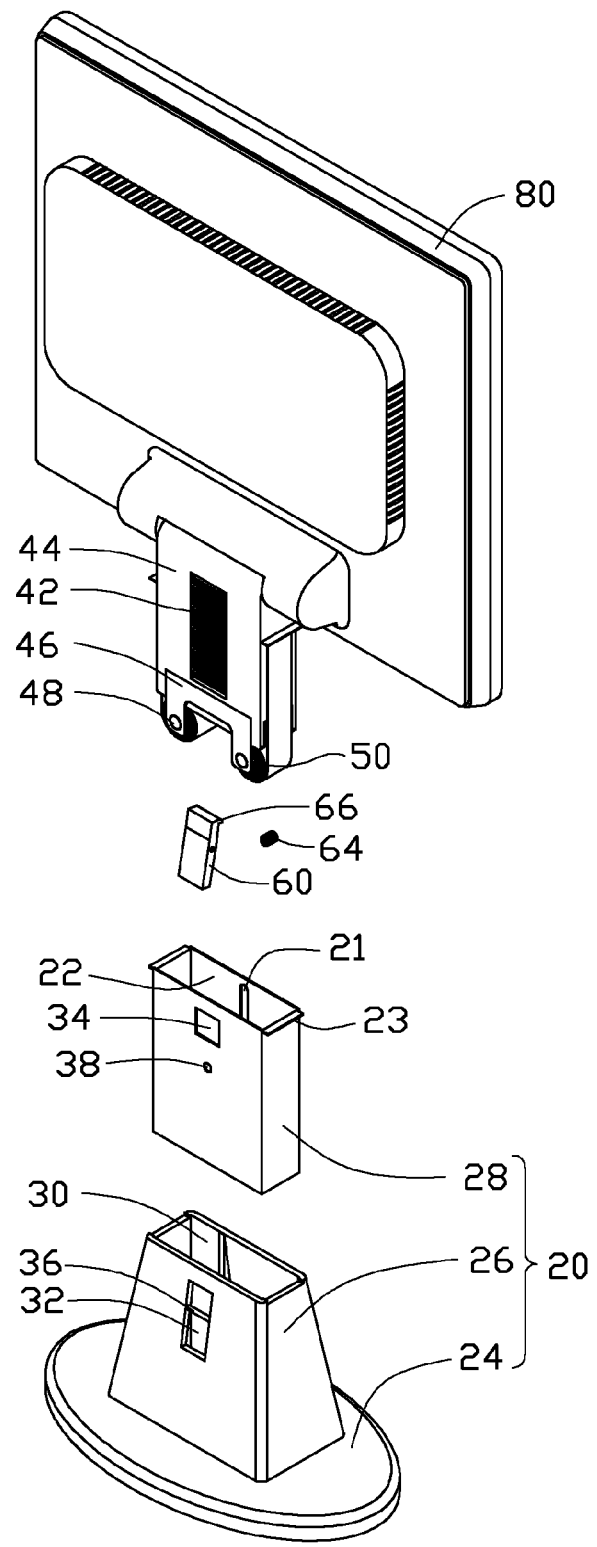
FIG. 3 is similar to FIG. 1, but viewed from a different viewpoint.

Referring to FIGS. 2 and 3, the base 20 includes a pedestal 24, a first sleeve 26 protruding from the pedestal 24 and a second sleeve 28. The first sleeve 26 defines a space 30. The second sleeve 28 is received in the space 30. The chamber 22 is formed in the second sleeve 28. The first sleeve 26 defines a positioning hole 32 in a sidewall. The second sleeve 28 defines a through hole 34 in a sidewall. The positioning hole 32 and the through hole 34 are aligned with each other groove 42. A pin 36 extends through the latching member 60 and includes two ends fixed to opposite edges of the positioning hole 32. The second sleeve 28 further defines a blind hole 38 below the through hole 34 and a sliding groove 21 along the height. The second sleeve 28 includes two ears 23 extending outward from opposite sides at an open end. The ears 23 are fixed to the edges at the top, open end of the first sleeve 26. In the exemplary embodiment, the second sleeve 28 is box-shaped. The sliding groove 21 is defined in a sidewall opposite the sidewall where the through hole 34 is defined.

The supporting member 40 includes a main body 44, two horizontally oriented rods 48 coupled to the main body 44 and two torsional spring sheets 50 respectively coiled around the rods 48. The display 80 is rotatably fixed to the top of the body 44. The grooves 42 are defined in a sidewall of the body 44. The body 44 is substantially cubed. The body 44 includes two plates 46 fixed to opposite sides and a protrusion 47 protruding from the one of the plates 46. Each plate 46 defines two through holes (not labeled) at opposite ends. Opposite ends of each rod 48 are inserted in two through holes of the two plates 46. The protrusion 47 is slidably received in the sliding groove 21 and serves as a stop to prevent the supporting member 40 from moving out of the chamber 22. In an alternative embodiment, the protrusion 47 may be formed on the body 44. Each torsional spring sheet 50 includes one end fixed to the ear 23 and another end fixed to the rod 48. The torsional spring sheets 50 are configured to urge the supporting member 40 toward a vertically upward direction.

The latching member 60 is rotatably received in the positioning hole 32 via the pin 36 The latching member 60 includes a hook 66 at one end. The hook 66 extends through the through hole 34 and can be received in one of the grooves 42, thus retaining the supporting member 40 in a desired vertical position. The height-adjustable display device 10 further includes a spring member 64. One end of the spring member 64 is received in the blind hole 38, and the other end of the spring member 64 abuts against other end of the latching member 60 away the hook 66. The spring member 64 applies a push force to the end of the latching member 60, which causes the hook 66 to be tightly received in the groove 42.

Figure 4:
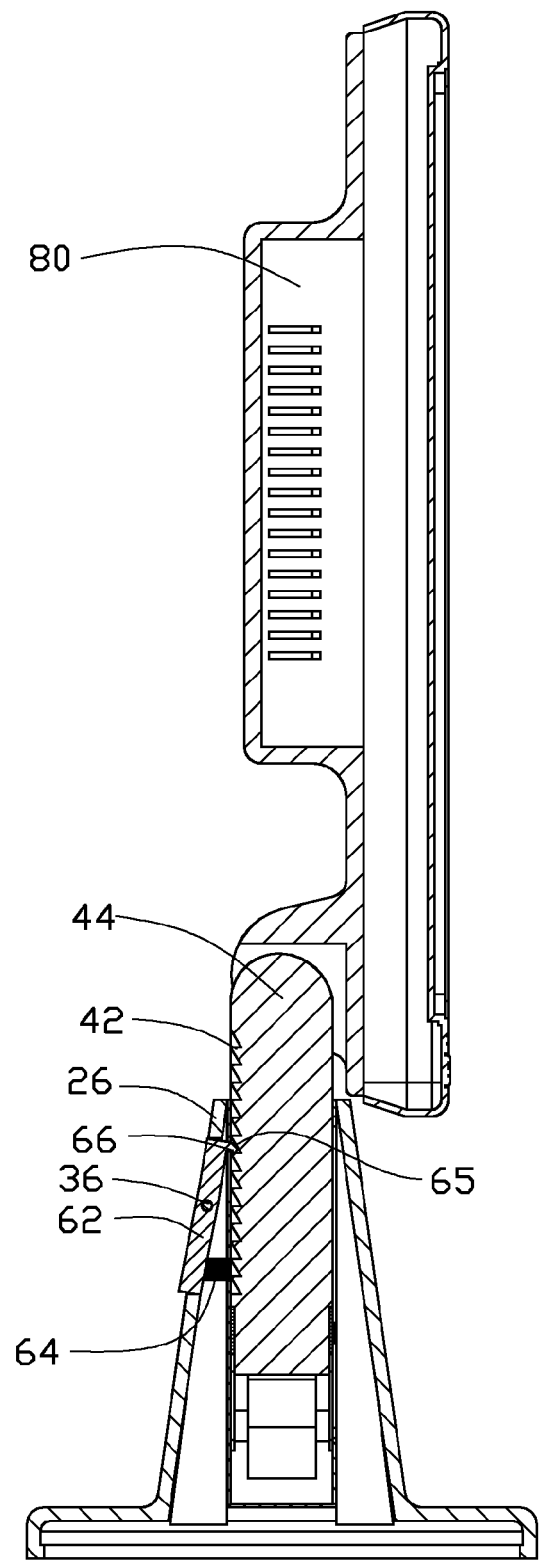
FIG. 4 is a cross-sectional view taken along the line IV-IV of FIG. 1.

Referring to FIGS. 3 and 4, when attempting to adjust the height of the display 80, a user can press the latching member 60. The clasping member 62 then rotate and the hook 66 moves out of one groove 42. The supporting member 40 then frees from the limitation of the hook 66. The user can then pull the display 80 upward or push the display 80 downward to a desired vertical position and release the latching member 60. The latching member 60 is then urged to rotate back under the elastic force of the spring member 64 until the hook 66 is received in one of the grooves 42, thereby retaining the display 80 in the desired vertical position. During the pulling of the display 80 upward, the torsional spring sheets 50 rebounds and provides a pushing force pushing the display 80 upward.

In the exemplary embodiment, the grooves 42 are sawtoothed. The distal end of the hook 66 is formed with a wedge-shaped surface 65 matching an inclined surface of the groove 42 receiving the hook 66. When adjusting the height of the display 80 downward, the user can directly push the display 80 downward. The wedge-shaped surface 65 is pushed by the inclined surface of the groove 42 and the hook 66 is urged to move out of the groove 42. When the user stops pushing the display 80, the hook 66 is received in one of the grooves 42 again.

It is to be understood, however, that even though numerous characteristics and advantages of the present disclosure have been set forth in the foregoing description, together with details of the structure and function of the present disclosure, the present disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:
1. A height-adjustable display device comprising:
a display;

a base comprising a first sleeve and a second sleeve received in the first sleeve, the first sleeve defining a positioning hole in a sidewall thereof, the second sleeve defining a through hole in a sidewall thereof and a chamber, the positioning hole and the through hole aligned with each other;

a supporting member received in the chamber, the supporting member being vertically movable in the chamber and configured to support the display thereon, the supporting member comprising a main body, a horizontally oriented rod coupled to the main body, a torsional spring sheet coiled around the rod, the torsional spring sheet having one end fixed to the base and another end fixed to the rod, the torsional spring sheet configured to urge the supporting member toward a vertically upward direction, the main body defining a plurality of vertically oriented grooves therein, the grooves, as a whole, arranged along a vertical direction; and a latching member received in the positioning hole and pivotably mounted to the base, the latching member comprising a hook at one end thereof, the hook configured to extend through the through hole to be engagingly received in one of the grooves, thereby retaining the supporting member in a desired vertical position.

2. The height-adjustable display device of claim 1, wherein the supporting member comprises two plates fixed to opposite sides of the main body, the plates each defines a through hole, opposite ends of the rod are inserted in the through holes of the plates.

3. The height-adjustable display device of claim 1, further comprising a spring member, wherein the second sleeve further defines a blind hole, the spring member is received in the blind hole and abuts against the other end of the latching member.

4. The height-adjustable display device of claim 1, wherein the base comprises a pin extending through the latching member, the pin having opposite ends fixed to opposite edges of the positioning hole.

5. The height-adjustable display device of claim 1, wherein one end of the torsional spring sheet is fixed to the second sleeve.

6. The height-adjustable display device of claim 1, wherein the supporting member comprises a protrusion protruding from the main body, the base defines a sliding groove, the protrusion is slidably received in the sliding groove.

* * * * *